United States Patent [19]

Lowery et al.

[11] 4,030,584

[45] June 21, 1977

[54] NORMALLY DISENGAGED ELECTRO-MAGNETIC SPRING CLUTCH CAPABLE OF FIELD ADJUSTMENT OF THE WRAP ANGLE

[75] Inventors: Robert D. Lowery, Willowick; Alphonso W. Mehrbrodt, Brecksville, both of Ohio

[73] Assignee: Marquette Metal Products Company, Cleveland, Ohio

[22] Filed: May 24, 1976

[21] Appl. No.: 689,040

[52] U.S. Cl. .......................................... 192/84 T
[51] Int. Cl.² .................. F16D 13/08; F16D 27/10
[58] Field of Search .................. 192/81 C, 84 T

[56] References Cited

UNITED STATES PATENTS

| 3,185,276 | 5/1965 | Sajovec, Jr. | 192/84 T |
| 3,349,880 | 10/1967 | Baer | 192/84 T |
| 3,684,068 | 8/1972 | Ford | 192/84 T |

Primary Examiner—Allan D. Herrmann
Attorney, Agent, or Firm—Arthur Frederick; Victor D. Behn

[57] ABSTRACT

The adjustment means is for permitting field adjustment of wrap-down angle or engagement time for the spring of a normally disengaged, electro-magnetic spring clutch which comprises a helical spring which surrounds first and second drums and is in interference fit with the first drum and connected to a rotatable armature, the armature being rotationally arrested upon energization of an electro-magnetic coil to effect contraction of the helical spring into interference fit with the second drum. The adjustment means comprises a pin and slot lost motion interconnection between the armature and the first drum which functions to allow rotative movement of the first drum relative to the armature when the rotation of the armature is arrested to effect an engaged operative condition. The adjustment means also includes retaining means theremoval of which permits the armature to be axially moved relative to the first drum for disengaging the pin and slot and permits the armature and the spring to be rotated relative to the first drum without disconnection of the spring from the first drum and armature.

11 Claims, 3 Drawing Figures

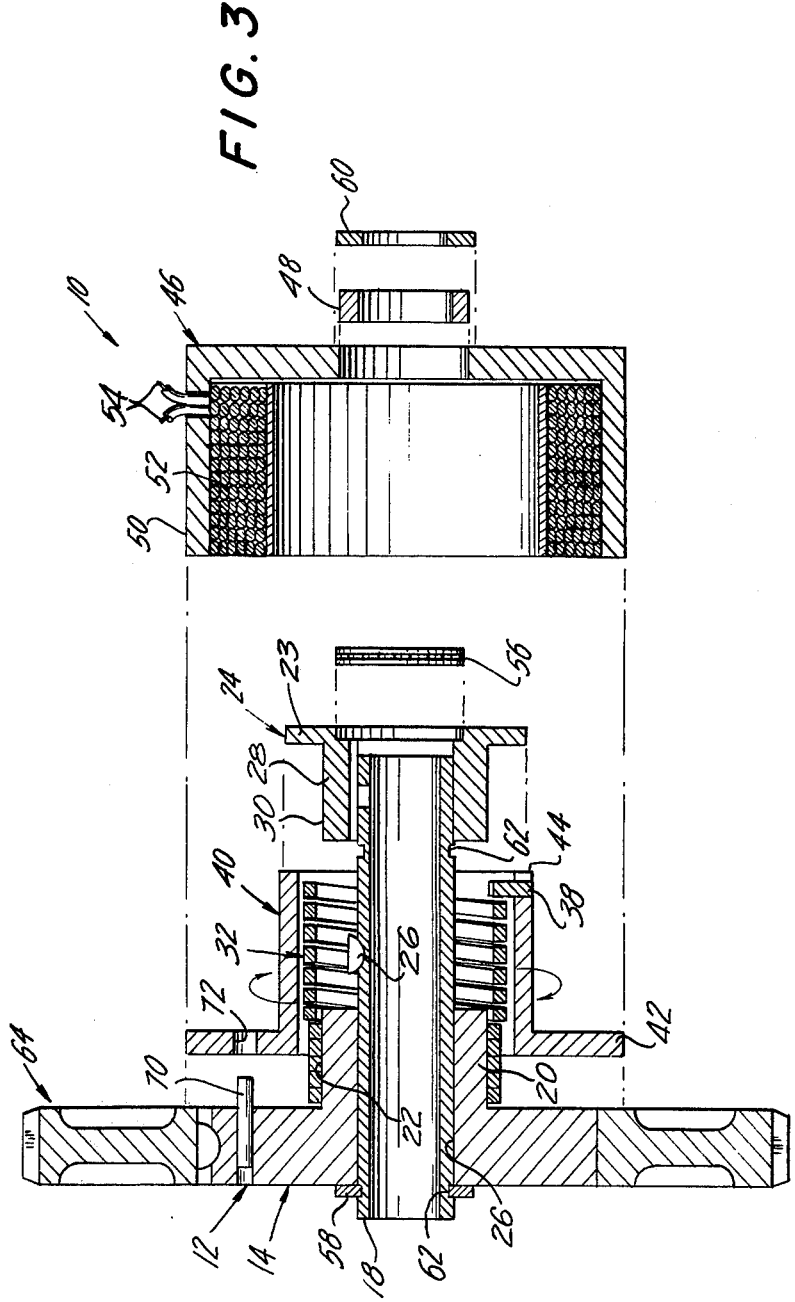

NORMALLY DISENGAGED ELECTRO-MAGNETIC SPRING CLUTCH CAPABLE OF FIELD ADJUSTMENT OF THE WRAP ANGLE

The invention relates to electro-magnetic spring clutches and, more particularly, to a normally disengaged electro-magnetic spring clutch of the type having a rotatable and axially movable armature coacting with an electro-magnetic coil to effect engagement and disengagement of the clutch.

BACKGROUND OF THE INVENTION

In electro-magnetic spring clutches of the type exemplified in the United States Patent No. 3,185,276 to Sajovec, Jr., dated May 25, 1965, in which the spring is normally disengaged, the wrap-down angle or the time duration for effecting engagement of the clutch is a factory adjustment which cannot be altered in the field. Other electro-magnetic spring clutches which have movable armatures, but are of the normally engaged type, are disclosed in the U.S. Pat. Nos. 2,976,976 to Parker, dated Mar. 28, 1961; Ford 3,684,068 dated Oct. 31, 1967; and Baer, 3,349,880 dated Oct. 31, 1967. The last mentioned patent reference discloses a clutch having pins interconnecting the armature and control sleeve or collar and passing through enlarged holes in a driven member, output drum or hub, which loose pin and hole interconnection permits, upon energization of the coil, overtravel of the output drum and unwinding of the spring from the input drum to thus effect disengagement of the clutch. In this clutch the duration of wrap-down of the spring is fixed at the factory. Other pin and slot interconnections are shown in the U.S. Pat. Nos. 3,373,851 to Baer, dated Mar. 19, 1968 and Helander, 3,835,972 dated Sept. 17, 1974 for preventing reverse rotation of the output hub or drum upon disengagement of a normally engaged clutch.

Accordingly, it is one of the objects of this invention to provide, in a normally disengaged, electro-magnetic spring clutch, accurate field adjustment of the duration of time for effecting clutch engagement.

It is another object of the present invention to provide a normally disengaged, electro-magnetic spring clutch capable of a broad range of applications without factory reconstruction or adjustment.

It is a further object of this invention to provide a normally disengaged, electro-magnetic spring clutch which is capable of adjustment of the duration of time to effect clutch engagement and is of relatively simple and inexpensive construction.

It is a still further object of the present invention to provide a normally disengaged, electro-magnetic spring clutch which is capable of having its duration of time for effecting engagement after energization changed quickly and easily and without special or complex tools.

SUMMARY OF THE INVENTION

Accordingly, the present invention contemplates in a normally disengaged, electro-magnetic spring clutch, an adjustment means for permitting field adjustment of the wrap-down angle or the time interval between energization and engagement.

The normally disengaged, electro-magnetic spring clutch comprises a helical spring which surrounds first and second drums and is in interference fit with the first drum and connected to a rotatable armature. An electro-magnetic coil is disposed adjacent the armature to control rotation of the latter. When energized, the electro-magnetic coil functions to hold the armature against rotation and, hence, effects engagement of the clutch by causing the coils of the helical spring to contract and grip the second drum in torque transmitting relationship. The first drum is connected to and is driven by a suitable source of rotary power (not shown).

The adjustment means comprises a lost-motion coupling means rotatively interconnecting the armature and the first drum to allow rotative movement of the first drum relative to the armature when the rotation of the latter is arrested to thereby permit, since the other end of the spring is held by the armature against rotation, contraction of the coils of the spring about the second drum in the engaged condition of operation. The adjustment means also comprises disconnection means for permitting the armature to be moved to uncouple the lost-motion coupling means without disconnection of the spring with the armature and first drum and permitting the recoupling of the lost-motion means with the armature, spring and first drum in different relative angular positions so that the duration of time for engagement of the spring after energization is changed.

BRIEF DESCRIPTION OF THE DRAWINGS

The invention will be more fully understood from the following description when considered in connection with the accompanying drawings in which:

FIG. 3 is an exploded view showing the component parts of the clutch when the wrap-down angle is being changed.

DETAILED DESCRIPTION OF THE PREFERRED EMBODIMENT

Figure 1:
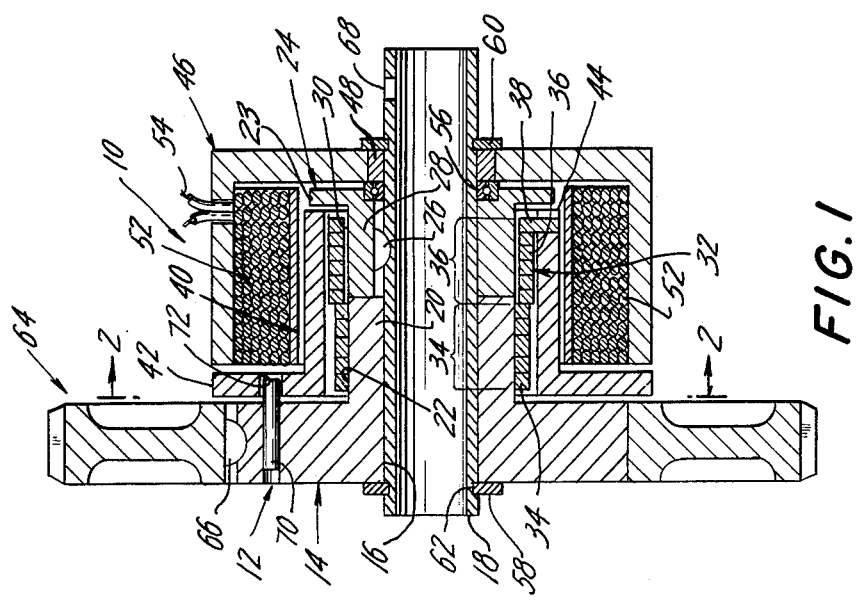
FIG. 1 is a longitudinal cross-sectional view of the electro-magnetic spring clutch according to this invention.
Figure 2:
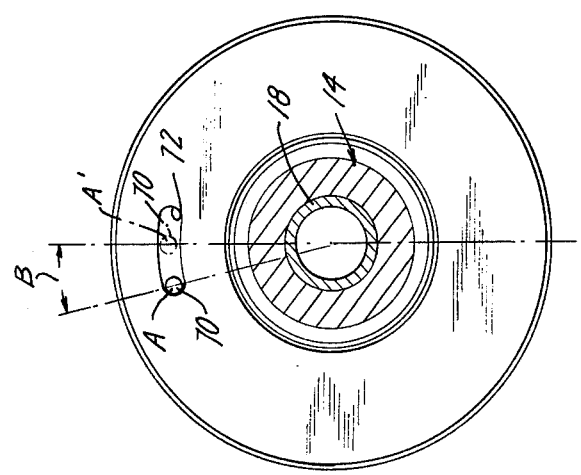
FIG. 2 is a view in cross-section taken substantially along line 2—2 of FIG. 1.

Now referring to the drawings and more specifically to FIGS. 1 and 2, the reference number 10 generally designates the normally disengaged, electro-magnetic spring clutch, according to this invention, which clutch is provided with an adjustment means 12 for permitting the changing of wrap-down angle or the duration of time from energization to torque transmission.

The electro-magnetic spring clutch 10 comprises an input hub or durm 14 which has a central bore 16 to receive therethrough a tubular output shaft 18. The input drum 14 has a cylindrical hub portion 20, the outer periphery of which forms a clutch surface 22. An output hub or drum 24 is suitably secured to output shaft 18, as for example, by a key 26, to rotatively drive the latter. The output drum 24 has a cylindrical hub portion 28 which is of a diameter such that its outer periphery, which forms a clutch surface 30, lies in coextensive relationship with clutch surface 22 of input drum 14.

A helically wound clutch spring 32 is disposed to surround the clutch surfaces 22 and 30. The spring 32 is of the stepped type in which a group of coils 34 are, in the relaxed condition of the spring, of smaller diameter than a second group of coils 36. The coils 34 are of such diametral dimensions with respect to clutch surface 22 that, when assembled, the coils 34 are in interference fit with clutch surface 22. The coils 36 are of such diametral dimensions with respect to clutch surface 30 that when in the disengaged operative condition, the coils are out of contact with clutch surface 30. The spring 32 is provided at one end with a radially offset end portion or tang 38 by which it is connected to an armature 40.

The armature 40 is a cylindrical member surrounding spring 32 and has a radially extending annular flange portion 42 positioned adjacent input drum 14. A notch 44 is provided in the end portion of armature 40 opposite from flange portion 42 to receive therein tang 38 of spring 32. The armature 40 may be of the type having an integral annular flange portion 42 as shown or may be of the two-piece type shown in the U.S. Pat. No. 3,905,458 to Mehrbrodt, dated Sept. 16, 1975. To control rotation of armature 40, an electro-magnetic field coil assembly 46 is supported on output shaft 18, through a bearing 48 to facilitate relative rotation between output shaft 18 and the field coil assembly 46.

The field coil assembly 46 comprises a cup-shaped housing 50 in which is disposed a doughnut-shaped electrical coil 52. The coil is connected through electrical leads 54 to a source of electrical power. To further reduce frictional contact between fixed housing 50 and output drum 24, a thrust bearing 56 of suitable type may be provided between housing 50 and output drum 24.

The clutch components, namely, input drum 14, output drum 24, spring 32, armature 40, bearings 48 and 56 and field coil assembly 46, are secured together on output shaft 18, by two retaining members 58 and 60 which may be in the form of snap or split rings inserted in associated annular grooves 62 in output shaft 18.

The input drum 14 is connected to a source of rotary power (not shown) through suitable means, as for example, a gear 64 which is secured to input drum 14 by a key 66 or other conventional means. The output shaft 18 is connected at its end portion 68 to means (not shown) for transmitting rotation to other elements (not shown).

The adjustment means 12 comprises a lost-motion connection which may, as shown, comprise a pin 70 riding in an arcuate-shaped recess or slot 72. The slot 72 is formed in flange portion 42 of armature 40 to receive the distal end portion of pin 70 which is secured, at the opposite end, in input drum 14. In the disengaged operative condition of clutch 10, spring 32 rotates with input drum 14 by reason of its interference fit with the input drum. This rotation of spring 32 causes armature 40 to rotate in unison with input drum 14 by reason of its connection with spring 32 via tang 38. When field coil 52 of electro-magnetic coil assembly 46 is energized, armature 40 is axially drawn toward the coil so that the end of armature 40 abuts the flange portion 23 of output drum 24 and thereby retards rotation of the armature. When rotation of armature 40 is retarded, the end portion of the spring adjacent coils 36 is retarded from rotating, but input drum 14 continues to rotate and thus causes contraction of coils 36 into gripping relationship with clutch surface 30 of output drum 32. This continued relative rotative movement of input drum 14 relative to the armature is made possible by reason of lost motion between pin 70 and slot 72. As shown in FIG. 2, when coils 36 of spring 32 are wrapped-down into torque transmitting relation to clutch surface 30, pin 70 assumes a new position in slot 72, such as shown by the broken lines. The angle between the old position A and new position A' of pin 70 is known as the "wrap angle" and is designated B in the drawing. This wrap angle B represents the elapsed time for effecting engagement of the clutch after energization of coil 52. A change in this wrap angle B can be achieved by the method according to this invention.

In effecting a change in wrap angle B, retaining member 60 is first removed from its associated recess or groove 62 in output shaft 18. The electro-magnetic assembly 46 and bearings 48 and 56 are next slid from output shaft 18 as is shown in FIG. 3. The armature 40 is then slid axially to disengage pin 70 from slot 72. With spring 32 remaining connected at tang 38 with armature 40, the armature is rotated relative to input drum 14 in the over-running direction and within the limits of slot 72 to re-position coils 34 on clutch surface 22. The armature 40 is then slid back toward input drum 14 to restore the coupling with the input drum via pin 70 and slot 72. The output drum 24, bearing 48 and 56, and electro-magnetic coil assembly 46 are re-positioned on output shaft 18. The retainer member 60 is then replaced in its associated groove 62 thereby holding the clutch components in the assembled condition. In this manner, by trial and error, the precise duration of time for effecting engagement after energization can be obtained which is optimum for a particular application or use of clutch 10.

It is believed now readily apparent that a normally disengaged electro-magnetic spring clutch is provided which is capable of having its wrap angle adjusted in the field without structural modification of the clutch. It is a wrap angle adjustment which can be achieved easily and quickly without the use and need of special tools.

Although but one embodiment of the invention has been illustrated and described in detail, it is to be expressly understood that the invention is not limited thereto. Various changes can be made in the arrangement of parts without departing from the spirit and scope of the invention as the same will now be understood by those skilled in the art. As an example, output drum 24 and output shaft 18 could be made as a single element in which case retaining member 58 would have to be removed from its associated groove 62 to permit axial movement of the input drum portion and thereby provide the clearance necessary to uncouple the pin 70 and slot 72 connection. Furthermore, it is to be understood that, without departure from the scope and spirit of this invention, output drum 24 and output shaft 18 may be connected to a source of rotary power to become an input shaft and input drum while input drum 14 becomes an output drum driven by spring 32 suitably connected to the drums and having an appropriate helix relative to the direction of rotation.

What is claimed is:

1. In combination with a normally disengaged electro-magnetic spring clutch having a helical spring surrounding first and second drums and in interference fit with the first drum and connected to a rotatable armature, the armature being rotationally arrested upon energization of an electro-magnetic coil to effect contraction of the helical spring into interference fit with the other of said first and second drums, an adjustment means for permitting selection of a predetermined elapsed time from energization to torque transmission comprising:

a. a lost-motion coupling means for inter-connecting the armature with said first drum to allow rotative movement of the first drum relative to the armature when the rotation of the latter is arrested to provide an engaged condition of operation; and b. disconnection means for permitting the armature to be moved to uncouple the lost-motion means without disconnection of the spring with the armature and first drum and recoupling of the lost-motion connection with the armature, spring and the first drum in a different relative angular position.

2. The apparatus of claim 1 wherein said spring is in interference fit with the first drum and out of interference fit with the second drum in the disengaged operative position.

3. The apparatus of claim 1 wherein said disconnection means is removable retainer members for securing the first and second drums and electro-magnetic coil in assembled operative relationship.

4. The apparatus of claim 3 wherein the retainer members are split rings.

5. The apparatus of claim 1 wherein the lost-motion means is a lug projecting into an arcuate recess.

6. The apparatus of claim 5 wherein the lug is carried by the first drum and the arcuate recess is in the armature.

7. The apparatus of claim 1 wherein the armature is a sleeve surrounding the spring and having a radially extending flange and wherein said lost-motion means comprises a lug carried by the first drum and an elongated recess in the flange to receive a portion of said lug.

8. The apparatus of claim 7 wherein said lug is a pin and said elongated recess is an arcuate slot.

9. In a normally disengaged, electro-magnetic spring clutch comprising a helically wound spring surrounding an input and output drum and in interference fit with the input drum and connected to a rotatable armature which surrounds the spring and an electro-magnetic coil disposed adjacent the armature to control rotation of the latter and a lost-motion coupling means for rotatively interconnecting the armature with said input drum to rotate with the input drum in the disengaged operative position and allow limited rotative movement of the input drum relative to the armature when the rotation of the latter is arrested, the electro-magnetic coil, upon energization, functioning to arrest rotation of the armature and effect thereby contraction of the coils of the spring about the output drum and the transmission of torque from the input drum to the output drum, and method of adjusting the elapsed time for engagement after energization of the electro-magnetic coil comprising the steps of: 'a. separating the electro-magnetic coil from the other clutch components;

b. sliding the armature relative to the input drum until the lost-motion coupling means is uncoupled and the armature is free for rotative movement relative to the input drum;

c. rotating the armature relative to the input drum without disconnecting the spring from the armature and said input drum; and d. sliding the armature relative to the input drum to recouple the lost-motion coupling means with the armature, spring and the input drum in different relative angular positions.

10. The method of claim 9 wherein the separation step of the electro-magnetic coil includes the step of removal of a retaining ring securing and holding the clutch in assmbled condition.

11. The method of claim 9 wherein rotation of the armature in relation to the hand of helical spring is in the overrunning direction.

* * * * *